United States Patent [19]

Hoffman, Jr. et al.

[11] Patent Number: 5,869,950
[45] Date of Patent: Feb. 9, 1999

[54] METHOD FOR EQUALIZING THE VOLTAGE OF TRACTION BATTERY MODULES OF A HYBRID ELECTRIC VEHICLE

[75] Inventors: David William Hoffman, Jr., Port Crane; Timothy Michael Grewe, Endicott, both of N.Y.

[73] Assignee: Lockheed Martin Corp., Johnson City, N.Y.

[21] Appl. No.: 961,571

[22] Filed: Oct. 30, 1997

[51] Int. Cl.⁶ ................................................ H01M 10/44
[52] U.S. Cl. .......................... 320/103; 320/116; 320/132
[58] Field of Search .................................... 320/103, 104, 320/116, 118, 119, 120, 121, 122, 123, 132, 105, 111, 114, 115, 117

[56] References Cited

U.S. PATENT DOCUMENTS

| | | | |
|---|---|---|---|
| 5,206,578 | 4/1993 | Nor | 320/118 |
| 5,438,250 | 8/1995 | Retzlaff | 320/17 |
| 5,504,415 | 4/1996 | Podrazhansky et al. | 320/118 |
| 5,592,067 | 1/1997 | Peter et al. | 320/118 X |
| 5,619,417 | 4/1997 | Kendall | 364/483 |
| 5,644,212 | 7/1997 | Takahashi | 320/48 |
| 5,646,534 | 7/1997 | Kopera | 324/434 |
| 5,666,040 | 9/1997 | Bourbeau | 320/118 |
| 5,670,861 | 9/1997 | Nor | 320/15 |

*Primary Examiner*—Edward H. Tso
*Attorney, Agent, or Firm*—W. H. Meise; G. H. Krauss

[57] ABSTRACT

A hybrid electric vehicle includes a lead-acid traction battery made up of a plurality of series-connected modules. During operation of the vehicle, the traction battery is discharged for acceleration, and charged by an ancillary power source. To maximize the capacity of the traction battery to accept regeneration charge current from dynamic braking, and to produce useful traction motor current, the modules of the traction battery are equalized during normal operation of the hybrid electric vehicle.

9 Claims, 8 Drawing Sheets

METHOD FOR EQUALIZING THE VOLTAGE OF TRACTION BATTERY MODULES OF A HYBRID ELECTRIC VEHICLE

FIELD OF THE INVENTION

This invention relates to methods for maintaining the charge state of the traction battery of a hybrid electric vehicle.

BACKGROUND OF THE INVENTION

Hybrid electric vehicles are widely viewed as being among the most practical of the low-polluting vehicles. A hybrid electric vehicle includes an electric "traction" battery which provides electric power for an electric traction motor, which in turn drives the wheels of the vehicle. The "hybrid" aspect of a hybrid electric vehicle lies in the use of a secondary or supplemental source of electrical energy for recharging the traction battery during operation of the vehicle. This secondary source of electrical energy may be solar panels, a fuel cell, or a generator driven by an internal combustion engine. When an internal combustion engine is used as the secondary source of electrical power, it commonly is a relatively small engine which uses little fuel, and produces little pollution. A concomitant advantage is that such a small internal combustion engine can be operated within a limited RPM range, so that pollution controls of the engine may be optimized.

The terms "primary" and "secondary" when used to describe the sources of electrical energy merely relate to the way energy is distributed during operation, and are not of fundamental importance to the invention.

The traction battery of a vehicle is often made up from a plurality of series-connected modules, each of which in turn is made up from one or more interconnected battery cells. One traction battery which is contemplated for use with the invention has a nominal voltage of 550 volts, and is made up of forty-six series-connected 12-volt modules. Each module may, of course, be made up of one or more common automobile-type batteries. A hybrid electric vehicle, unlike a purely electrically powered vehicle, is at least partially recharged during operation; that is to say, that the traction battery ordinarily does not arrive at a depot in a substantially discharged state, and consequently will not be in dire need of recharging. As a result, a hybrid electric vehicle is used much as an ordinary internal-combustion driven vehicle; it can be parked after a day's use, and started in the morning without recharging.

The most commonly available rechargeable batteries are the ordinary automotive-style lead-acid batteries, which use porous lead or lead composition plates, and use a dilute sulfuric acid electrolyte. It is desirable for reasons of cost and availability to use such batteries for hybrid electric vehicles. One disadvantage of lead-acid batteries is their weight, and another is the reduction of the electric charge capacity of the battery with use. The reduction of charge capacity manifests itself as an increase of impedance, which in turn reduces the current which can be drawn from the battery at any given voltage. The reduced charge capacity arises, at least in part, from "sulfation" or formation of a sulfate coating on the plates of the battery. This sulfation tends to occur when the battery is allowed to remain for long periods of time in a partially charged condition. Thus, when a hybrid electric vehicle is repeatedly parked overnight, sulfation tends to occur, with the result of loss of traction battery charge capacity.

Improved methods for maintenance of the batteries of hybrid electric vehicles are desired.

SUMMARY OF THE INVENTION

A method tends to equalize the voltages of the modules of a traction battery of a hybrid electric vehicle, in which the traction battery is made up of a plurality of series-connected modules. The method is performed by a programmed processor, and includes the step, while the vehicle is in operation, of sensing the voltages of each of the modules under conditions approximating a selected load condition, such as a heavy load current andor a heavy charging current, to thereby produce sensed module voltages. The sensed module voltages are stored, at least temporarily, to thereby produce stored sensed module voltages. At least some of the voltages are sorted into at least one ordered ranking. In a preferred method, there are two ordered rankings. At least one of the modules which has a stored sensed voltage near the maximum of the ranking is selected from the ordered ranking, to thereby identify a high module. Preferably, the selected module has the highest sensed voltage. Another one of the modules, which has a stored sensed voltage near the minimum of the ranking is selected from the at least one ordered ranking, to thereby identify a low module. The high module is partially discharged, and the energy made available by the partial discharge is used to charge the low module. In a particular embodiment of the method, the step of discharging the high module is performed until the voltage of one of the high module and the low module reaches a selected voltage. In another embodiment of the method, the selected voltage is an average which includes the voltages of at least some of those modules of the traction battery which are not the high module and the low module. More particularly, in an embodiment of the method, the average is an average which includes the voltages of all of the modules of the traction battery, including the high and low module. The step of partially discharging the high module, and coupling the energy made available by the discharging to charge the low module, is preferably performed by at least partially discharging the high module to an auxiliary battery, and at least partially discharging the auxiliary battery to the low module.

The step of the method involving sorting voltages of the modules into an ordered ranking includes sorting at least some of the voltages obtained when the traction battery is in a state of significant charging into a first ordered ranking, and sorting at least others of the voltages obtained when the traction battery is in a state of significant discharge into a second ranking. The one of the modules which has a stored sensed voltage near the maximum of the first ordered ranking is selected from the first ordered ranking. The one of the modules which has a stored sensed voltage near the minimum of the second ordered ranking is selected from the second ordered ranking to thereby identify a low module.

DESCRIPTION OF THE INVENTION

Figure 1:
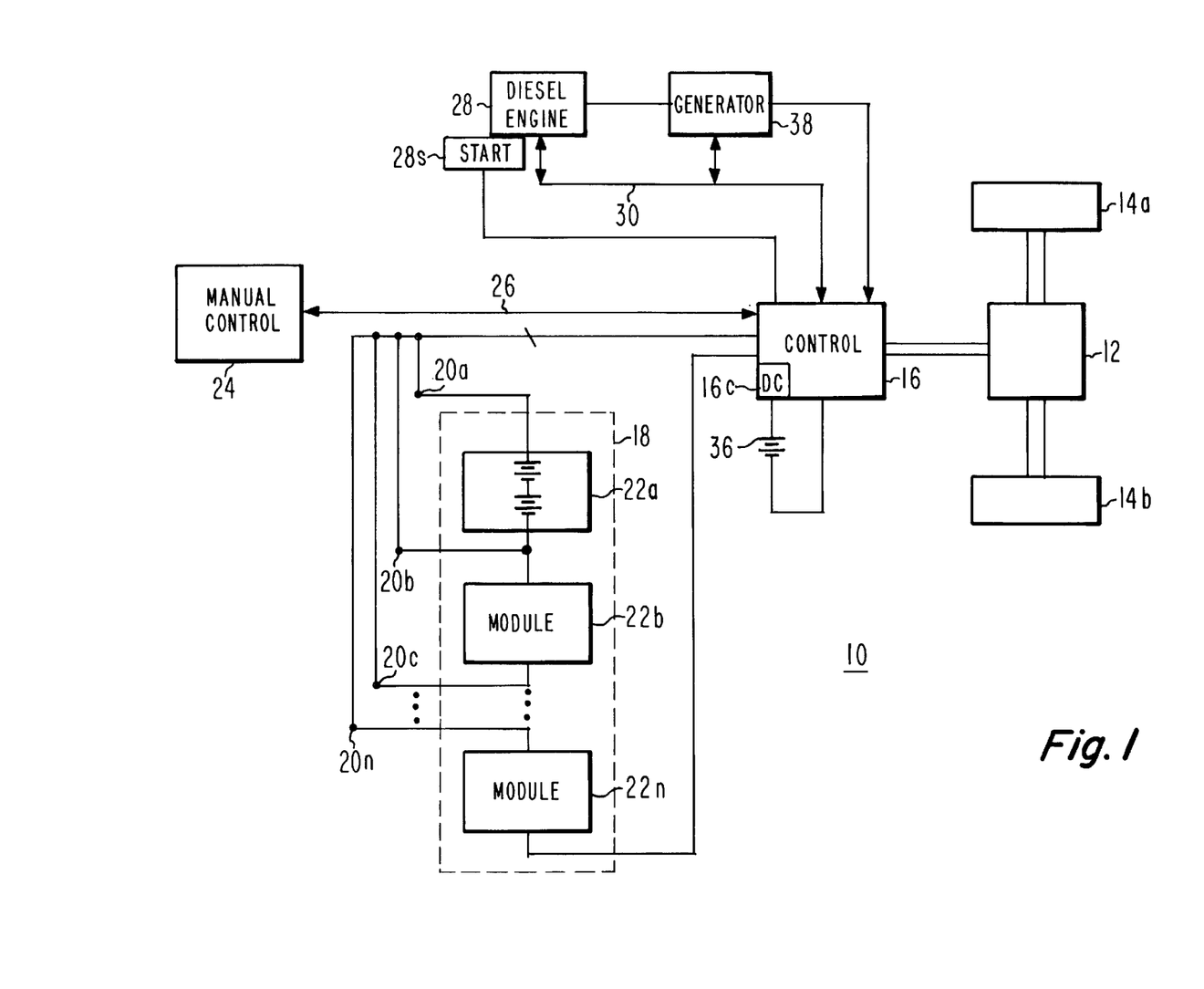
FIG. 1 is a highly simplified block diagram of power and control portions of a hybrid electric vehicle.

FIG. 1 represents the power system of a hybrid electric vehicle. In FIG. 1, a hybrid electric vehicle 10 includes a traction motor 12 which drives one or more wheels 14a, 14b under control of an electrical energy controller 16. Energy controller 16 is connected to various taps 20a, 20b, 20c, . . . , 20n on the traction battery 18. Each tap 20a, 20b, 20c, . . . 20n is connected to the positive end or terminal of each of a plurality of modules 22a, 22b, . . . , 22n. As also illustrated in FIG. 1, module 22a is made up of two series-connected 12-volt batteries. All of the other modules 22b, . . . , 22n are similar to module 22a.

The manual controls by which an operator controls the acceleration, braking and other functions of the vehicle are illustrated together in FIG. 1 as a block 24, which connects to the energy controller 16 by way of a bus 26. An internal combustion engine, illustrated as a diesel engine 28, is controlled by control signals applied from energy controller 16 over a bus 30. Engine 28 produces mechanical rotation, which is applied to an electrical generator 32. The field excitation, and possibly other parameters of the generator 32, are controlled from energy controller 16 over bus 30. The electrical power produced by generator 32 is applied to energy controller 16. Energy controller 16 receives the operator commands from manual controls 24, and routes power from the traction battery 18 to traction motor 12 for acceleration, and returns energy to traction battery 18 during regenerative dynamic braking. Energy controller 16 also controls the generation of electrical power by engine 28 and generator 32, and routes the power so generated to at least the traction battery, all as known in the art. Furthermore, control block 16 includes a plurality of electronically controlled power switches (not illustrated) which are associated with all of the power-handling devices, including the individual modules 22a, 22b, . . . , 22n of the traction battery, for providing control as described below. Control block 16 also includes a dc-to-dc converter 16c, further described below. A common energy reservoir in the form of an auxiliary 12-volt battery 36 is connected to energy controller 16 for keeping the electronic controls alive during vehicle shutdown, and for operating engine starter 28s under control of the energy controller.

As mentioned above, the lead-acid battery or batteries of the individual modules 22a, 22b, . . . , 22n are subject to degradation if they remain partially discharged for long periods of time. According to an aspect of the invention, the traction battery is not fully charged as a unit, because a fully charged traction battery, when the vehicle is in use, may be required to accept power returned from the energy controller 16 during those intervals in which regenerative braking is performed. Since the fully charged traction battery should not be required to accept more charge in order to prevent gassing of the battery modules, the traction battery is not given a full charge when the vehicle is stopped. According to a further aspect of the invention, one or more of the modules of the traction battery, but not all of the modules of the traction battery, are periodically maintained by fully charging them, and then discharging them to their charge state prior to the full charge. This maintenance procedure is performed from time to time, with the modules selected for full charging and subsequent partial discharging being cycled so that eventually all modules have been maintained. With this maintenance procedure, each module occasionally receives a full charge to inhibit sulfation, while the traction battery itself always begins a day's operation with a partial charge, so that overcharging cannot occur.

The maintenance procedure or method according to an aspect of the invention involves occasional full charging of each of the modules of the traction battery. While the full charging of a single module may not take a great deal of time, the full charging procedure of all of the modules of the traction battery will require a relatively long period of time, as for example over a period of several days. Since the maintenance procedure is broken into many small portions, well separated in time, some way must be provided for knowing which modules have not been recently charged. For this purpose, the energy controller 16 of FIG. 1 includes at least a memory which maintains a log of which modules have recently been maintained in accordance with the invention, and which have not. Since the controller is part of the vehicle, and is performing maintenance only for the particular vehicle in which it is installed, there is no need for a vehicle identification number. If the maintenance controller were to be separate from the vehicle, as for example at a depot, it would additionally need a memory location for storing information relative to each vehicle which it might be required to maintain.

Figures 2A, 2B, 2C:
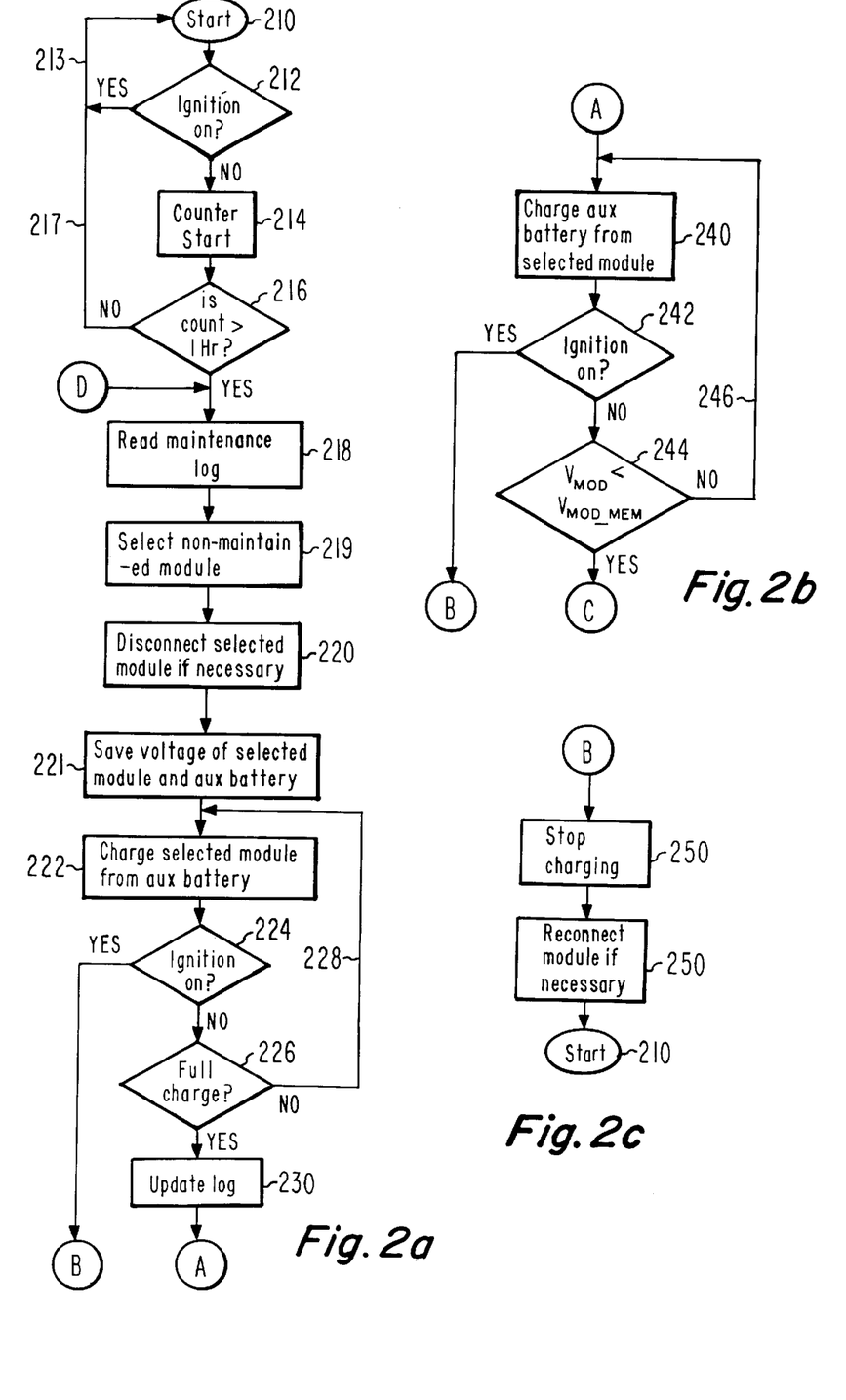
FIGS. 2a, 2b, 2c, 2d and 2e together constitute a simplified flow chart illustrating a logic flow which, in accordance with an aspect of the invention, controls the charge state of the traction battery modules of the arrangement of FIG. 1 during those intervals in which the hybrid electric vehicle is not in operation, in order to maintain the charge capacity of the battery modules.

In FIG. 2a, the logic controlling the maintenance of the modules of the traction battery begins at a START block 210, and the logic proceeds to a decision block 212, which examines the state of the ignition switch, which is chosen as a surrogate to indicate whether the vehicle is operating or not. Naturally, other indicia might be used to provide such an indication, such as, for example, rotation of the wheels, current drain from the traction battery, or current flow in the traction motor. If the ignition switch is ON, indicating that the vehicle is operational, the logic leaves decision block 212 by the YES output, and returns by a logic path 213 to START block 210. Thus, so long as the vehicle is operational, the logic circulates about the loop including START block 210 and decision block 212. Eventually, the ignition switch will be turned OFF, indicating that the vehicle is not in operation. When this condition occurs, the logic leaves decision block 212 by the NO output, and initiates or starts a time counter, as represented by block 214. The time counter increments so long as the ignition switch is OFF, thus providing an indication of how long the vehicle has not been operational. The time indicated by the counter associated with block 214 is monitored by a decision block 216. So long as the count associated with the counter of block 214 does not equal the count for which decision block 216 is programmed, the logic leaves decision block 216 by the NO output, and proceeds by way of a path 217 and path 213 back to START block 210. After a period of time selected to eliminate short stops, such as a delivery vehicle might make, as for example a period of one hour, the count of the counter will equal the count for which decision block 216 is programmed, and the logic will then leave decision block 216 by the YES output. The leaving of decision block 216 by the YES output signifies that the vehicle has been inoperative for a length of time which suggests that the vehicle is out of service, and that there is a likelihood that the vehicle will remain out of service for the duration of the module maintenance. Thus, the module maintenance process begins when the logic enters block 218.

From the YES output of decision block 216 of FIG. 2a, the logic proceeds to a further block 218, which represents the reading of the maintenance log, to determine which of the modules of the traction battery have been most recently maintained. In logic block 219, that one of the modules is selected for maintenance during the current interval which has gone for the longest period of time since full charging maintenance in accordance with the invention, or if more than one module is to be maintained, that one of the modules will be among the group of modules which is selected. Following selection of a module for maintenance in block 219, the selected module is disconnected from the traction battery, if necessary, as suggested by logic block 220 of FIG. 2a. If only one module is selected for maintenance, and if the traction battery is electrically floating or unreferenced, the module may not need to be disconnected from the traction battery. In any case, the logic proceeds to a further block 221, which represents the sensing of the voltage of the module to be maintained, and the storage of the module voltage in a memory. At the same time, the voltage of the auxiliary battery 36 of FIG. 1 is sensed and saved in memory. In all cases herein, measurements of voltage of a battery are compensated for both battery temperature and battery current.

The logic of FIG. 2a flows from block 221 to a block 222, which represents the charging of the selected module toward a fully charged condition, using energy derived from the auxiliary battery 36 of FIG. 1. This step requires that the energy controller 16 of FIG. 1 utilize dc-to-dc converter 16c, which is capable of converting the voltage of auxiliary battery 36 into a voltage capable of charging the selected module. Such converters are well known in the art. From block 222, the logic of FIG. 2a flows to a decision block 224, which monitors the state of the ignition switch of the vehicle. If the ignition switch goes ON at any time during the charging of the selected module toward full charge, the logic leaves decision block 224 by the YES output, and proceeds by way of a logic node B to a block 250 of FIG. 2c, which represents the immediate cessation of charging of the selected module. Block 252 represents reconnection of the selected module to the traction battery, if necessary, and the logic then proceeds back to the START block 210, thereby prematurely ending the maintenance procedure. As described below, the selected module may at this time have a slightly higher voltage than other modules of the traction battery, as a result of its period of charging toward full charge. This slightly higher voltage is equalized according to another aspect of the invention, further described below.

The selected one of the modules continues to charge toward full charge as commanded by block 222 of FIG. 2a, so long as the ignition switch is not turned ON to prematurely end the charging interval, as described above in conjunction with FIG. 2c. The logic flows by way of the NO output of decision block 224 to a further decision block 226 so long as the ignition switch is not turned ON. Decision block 226 compares the current or present-time voltage of the module with a reference value representing the full-charge voltage of the selected module. So long as the module being charged has not reached full charge, the logic leaves decision block 226 by the NO output, and flows by way of a logic path 228 back to block 222, which represents continuing the charging procedure. Thus, the selected module continues to charge, drawing its energy from the auxiliary battery 36 of FIG. 1 by way of dc-to-dc converter 16c, so long as decision block 226 finds that its voltage has not reached the reference full-charge value. Eventually, the module voltage will reach the full-charge value, and the logic will leave decision block 226 by the YES output, and proceed to a logic block 230, which represents updating of the maintenance log to reflect full charge or completion of maintenance on the selected module. From logic block 230, the logic flows by way of a logic node A to logic block 240 of FIG. 2b.

It should be noted that the auxiliary battery might drop below an acceptable level of charge during the charging of the selected one of the modules: in that event, the charging of the selected module is immediately terminated (by a logic path, not illustrated), and the logic immediately transfers to node F of FIG. 2d, which recharges the auxiliary battery from the traction battery. It should also be noted that, if the charging procedure of a given module is interrupted, as for example by a need to recharge the auxiliary battery, the module so affected has a higher charge after the auxiliary battery charging than before it had before the module maintenance process was begun, and consequently now has a higher terminal voltage than the value which was originally stored in memory in block 221. When the vehicle is again in a state which allows the selected module to continue to be charged for maintenance purposes, the new logic cycle differs subtly from the first logic process, because the original stored terminal voltage, which represents the original charge state of the module, should be retained, and not overwritten by the now-current terminal voltage.

At this point in the module maintenance procedure, the selected module has been fully charged, which accomplishes a first portion of the desired result, namely the portion which has to do with reducing sulfation by fully charging the module. However, as a result of the full charge of the selected module, operation of the vehicle might result in the application of additional charging current to the traction battery, and therefore to the now-fully-charged selected module. This is undesirable, as it may result in gassing of the module. According to an aspect of the invention, the selected module is partially discharged after full charging. The partial discharge is accomplished by one of two methods, depending upon the situation. The first method partially discharges the selected module from its fully charged state to the voltage which it had prior to initiation of the full-charging part of the maintenance procedure, by reversing the direction of operation of dc-to-dc converter 16c of FIG. 1 (or by using another converter), using energy from the fully charged selected module to recharge the auxiliary battery 36. This has the salutary effect of leaving the energy state of the vehicle as a whole in the same condition as when it started the maintenance process, save, or except for, unavoidable heating losses during the procedure. The second method for partially discharging a fully charged module is used when the charging toward the fully charged condition is interrupted by operation of the vehicle; in this case the traction battery, and each module of the traction battery, changes its energy state as the vehicle operates, with some charging of the traction battery due to operation of the generator, and some discharge attributable to the load due to vehicle acceleration. The change of energy state results in change in the voltage of the traction battery, and of its constituent modules. Thus, the previously memorized value representing the voltage of the selected module is no longer highly meaningful, so the selected one of the modules is partially discharged by a dc-to-dc converter, which may be converter 16c or some other converter, and the energy taken from the selected module during partial discharge is applied to the other modules of the traction battery to charge the other modules toward the voltage of the selected module. So, in other words, the "overcharged" selected module is discharged to thereby reduce its voltage, while the energy from the discharge of the selected module is used to charge the other modules to thereby increase their voltage, with the discharge of the selected module being stopped when its voltage equals some average value of the voltage of the other modules.

In FIG. 2b, logic block 240 represents the charging of the auxiliary battery 36 from the selected module, in a manner corresponding to the "first" method described above. From logic block 240, the logic flows to a decision block 242, which continuously monitors the ignition switch, to determine if the discharging process should be terminated prematurely. If the ignition switch goes ON, the logic leaves decision block 242 by the YES output, and flows by way of logic node B to the logic of FIG. 2c, which stops the maintenance procedure. So long as the ignition switch is not turned ON, the logic flow exits from decision block 242 by the NO output, and flows to a further decision block 244, which compares the battery voltage $V_{MOD}$ of the discharging selected module with the stored voltage value $V_{MOD-MEM}$. So long as the module voltage $V_{MOD}$ does not equal the stored value $V_{MOD-MEM}$, the logic leaves decision block 244 by the NO output, and returns by a logic path 246 to block 240, to continue the discharge. When the module voltage $V_{MOD}$ becomes less than the stored value $V_{MOD-MEM}$, the logic leaves decision block 244 by the YES output, and proceeds by way of a logic node C to a block 258 of FIG. 2d.

Figure 2D:
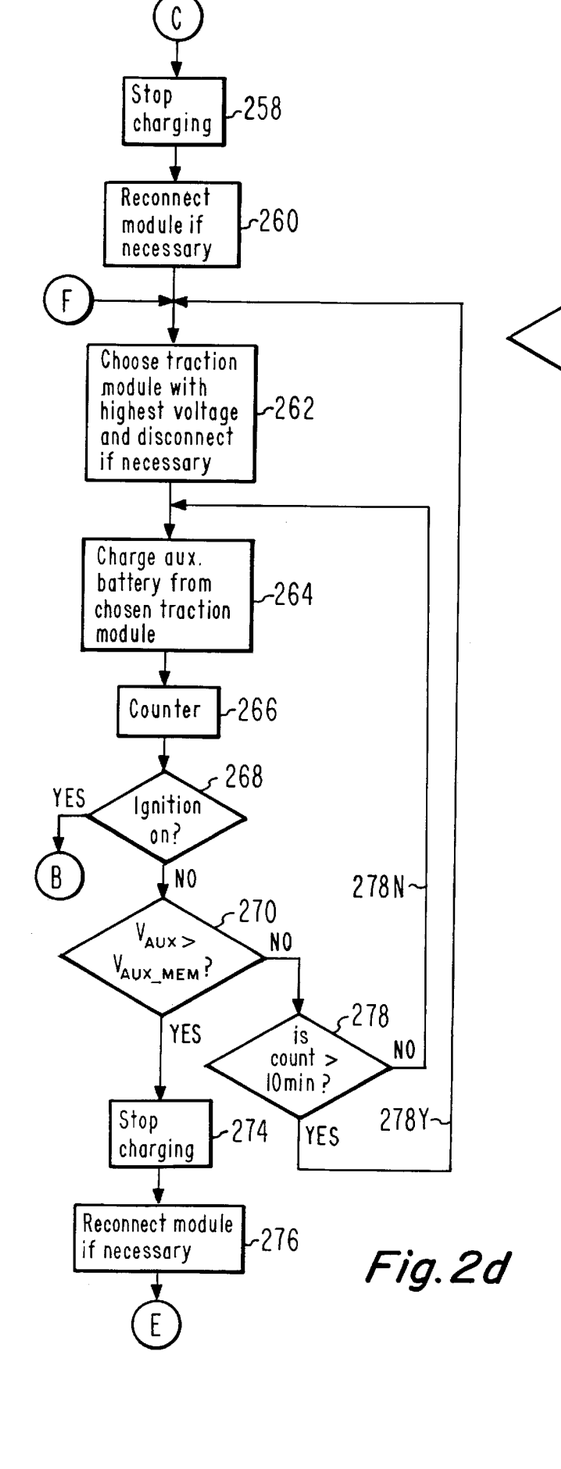

The logic of FIG. 2d represents, during the OFF time of the vehicle, recharging the auxiliary battery 36a from the traction battery. This recharging is done not from the traction battery as a whole, but instead from those modules of the traction battery which have the highest voltage. The recharging is accomplished, in general, by selecting the highest-voltage one of the modules, and discharging that one of the modules to the auxiliary battery, thereby reducing the voltage of the highest-voltage module toward the average voltage of the modules, and simultaneously at least partially recharging the auxiliary battery. This process of partial charge of the auxiliary battery may be performed from as many modules as desired. More particularly, after the maintenance charging and partial discharging of the selected one or ones of the modules 22a, 22b, . . . , 22n of the traction battery, the logic flows to the logic of FIGS. 2d and 2e for recharging the auxiliary battery, to make up for unavoidable heating losses which occur during the module topping-off and partial discharging (maintenance) process. More particularly, when the logic flows to block 258 of FIG. 2d from logic node C, the charging of the auxiliary battery 36 from the selected one of the modules is stopped. Logic block 260 represents reconnection of the selected one of the modules to the traction battery, if it was disconnected in order to perform the full charging and partial discharging. From logic block 260, the logic flows to a logic block 262, which represents comparison of the voltages of the various modules of the traction battery with each other, and selection of that one of the modules which has the highest voltage. Block 262 also represents disconnection of that highest-voltage module from the traction battery, if necessary. From logic block 262, the logic flows to a block 264, which represents the charging of the auxiliary battery from the chosen one (the highest-voltage one) of the modules of the traction battery, which tends to discharge the highest-voltage module by transferring energy to the auxiliary battery. The logic flows from block 264 to initiate a counter, as represented by a block 266, and then flows to a decision block 268. Decision block 268 monitors the state of the ignition switch, and routes the logic by way of logic node B to FIG. 2c, to terminate the maintenance procedure if the vehicle goes into operation. So long as the vehicle does not go into operation, the logic leaves decision block 268 by the NO output, and proceeds to a further decision block 270, which compares the current or present-time voltage of the auxiliary battery 36 with the value which it had prior to the beginning of the maintenance procedure, which was stored in memory as described in conjunction with block 221 of FIG. 2a. So long as the voltage of the auxiliary battery 36 is not greater than its original value before the commencement of maintenance, the logic leaves decision block 270 by the NO output, and proceeds to a further decision block 278, which aids in establishing a maximum charging time. If the voltage of the auxiliary battery becomes equal to the previously stored value before the expiry of the allowable time interval, the logic leaves decision block 270 by way of the YES output, and flows to a block 274, which represents cessation of the charging of the auxiliary battery from the highest-voltage module. The achievement of the original charge level of the auxiliary battery means that the charging of the auxiliary battery from the traction battery should stop, and therefore also means that the equalization of the voltages of the modules of the traction battery must stop. Block 276 represents reconnection of the module to the traction battery, if necessary. From block 276, the logic flows by way of a logic node E to a block 280 of FIG. 2e.

If the charging of the auxiliary battery from the traction battery proceeds without the auxiliary battery having reached full charge, the logic of FIG. 2d leaves decision block 270 by the NO output, as mentioned above, and reaches further decision block 278. Block 278 compares the count of the counter associated with block 266 with a value representing a selected maximum time for transfer of energy from a module of the traction battery to the auxiliary battery, and returns the logic by way of its NO output and a logic path 278N to block 264, to continue the charging. When the counter associated with block 266 reaches the limit count, which may represent, for example, ten minutes, the logic leaves decision block 278 by the YES output, and returns by way of a logic path 278Y to block 262, to once again check to see if the selected module is still the highest-voltage module. If the current module is still the highest, charging of the auxiliary battery can continue from the current module. Thus, the loop including blocks 262, 264, 266, 268, 270, 274, 276, and 278 selects the highest-voltage module of the traction battery, and charges the auxiliary battery therefrom. The highest-voltage module is periodically reviewed to confirm that it remains the highest-voltage module, and if it is not, the next module which is the highest is selected to provide the energy for charging the auxiliary battery. This process continues until the auxiliary battery has reached its original charge, and the logic flow then flows by way of the YES output of decision block 270, and by way of blocks 274 and 276, by way of logic node E to block 280 of FIG. 2e.

Figure 2E:
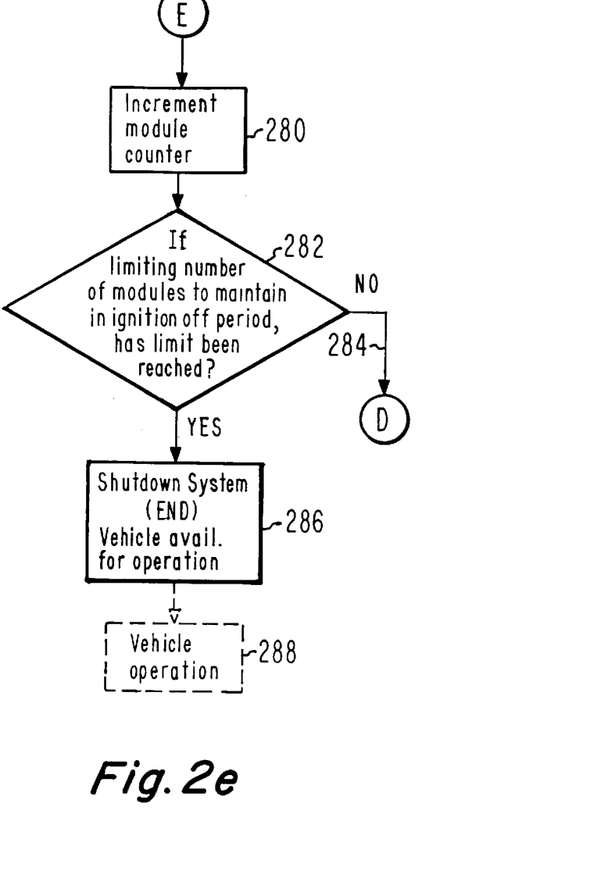

The logic of FIG. 2e limits the number of modules which are maintained in any one non-operating interval of the vehicle. The number of modules which are maintained by full charging and partial discharging can be limited to one module in each OFF-period of the vehicle, or to any plurality less than the total number of modules in the traction battery, or to all of the modules in the traction battery. No particular value is seen in performing maintenance to a number greater than the number of modules in the traction battery (with the result that some of the modules might be maintained twice during one vehicle OFF-interval), but the number could be so selected. The logic arrives at block 280 of FIG. 2e from logic node E. Block 280 represents the incrementing of a counter previously initialized to zero. Thus, after the first iteration of the logic through the logic of FIGS. 2a, 2b, 2c, and 2d, the module counter associated with block 280 will be set to a count of one. From block 280, the logic flows to a decision block 282, which compares the current count of the module counter with the limiting number, which as mentioned may be one or more than one. If the limit number has not been reached, the logic leaves decision block 282 by the NO output, and returns by way of logic node D to block 218 of FIG. 2a, for reading of the maintenance log, and selection of another module for maintenance. If the limiting number has been reached, the logic leaves decision block 282 by the YES output, and arrives at a STOP block 286, which ends the logic process for maintenance of the module or modules by fully charging and partial discharging. The vehicle is available for operation, which occurs sometime after the arrival of the logic at block 286, as illustrated by phantom block 288, if the operation does not occur earlier and interrupt the logic process.

Figures 3A, 3B:
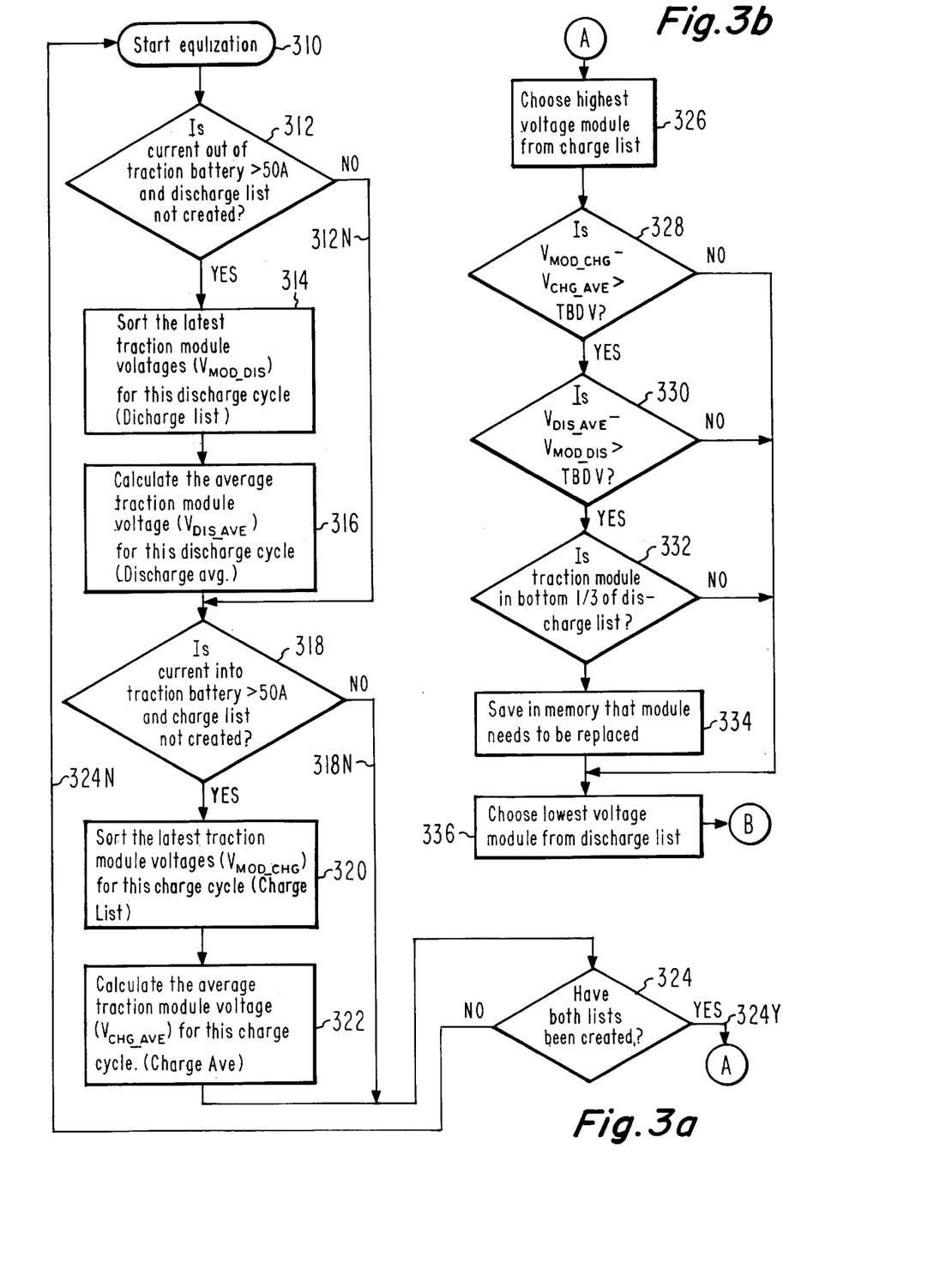
FIGS. 3a, 3b, 3c, 3d, and 3e together are a simplified flow chart which represents a logic flow which, in accordance with an aspect of the invention, evaluates the modules of the traction battery by ranking their voltages under various conditions, which identifies bad modules, and which shuffles energy among the modules in a manner which tends to equalize the module voltages.
Figure 4:
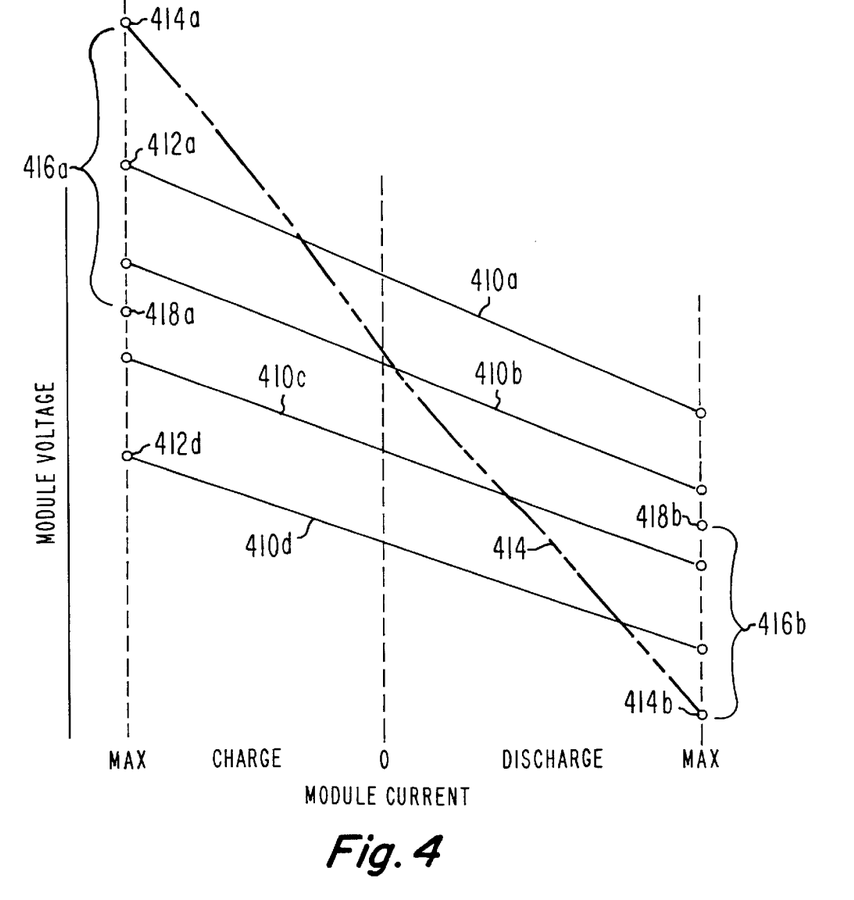
FIG. 4 plots module voltage against module current, as an aid in understanding how a bad module differs from a good module.

FIG. 3 is a simplified flow chart illustrating the logic flow for performing charge balancing of the modules of the traction battery of FIG. 1 during operation of the vehicle in accordance with another aspect of the invention. In this aspect of the invention, a "high" list is generated which represents a ranking of the module charge voltage during charging at a current level selected to represent a large charging current, and a "low" list is also generated which represents a ranking of the module discharge voltage during discharge at a large discharge current. One example of a large charge current is 50 amperes into the 550-volt traction battery, and a large discharge current may be the same current value as the large charge current, or it may be a different value. Ordinarily, the modules are expected to have about the same characteristics. FIG. 4 is a plot of the load voltage versus charge and discharge current characteristics of a plurality of similar modules of a traction battery. As illustrated in FIG. 4, the modules represented by lines 410a, 410b, 410c, and 410d have slightly different voltages at both high and low current, but their static internal impedances, which are represented by the slopes of the lines, are about equal. Their positions on the plot of FIG. 4 represent their ranking in voltage; the module represented by line 410a has the highest charging voltage, as indicated by the intersection of line 410a with the maximum (MAX) charging current at point 412a. Similarly, the module associated with line 410d has the lowest charging voltage, as suggested by point 412d. A ranking of the modules according to charging current merely lists the modules in accordance with the value of their intersections with the MAX charging current. Similarly, the intersections of the plots 410a, 410b, 410c, and 410d with the MAX discharge line represent the voltages of the various modules at the selected discharge current. The voltages are distributed, much in the same manner as the MAX charging voltages. The discharge voltages may be ranked in the same manner. The module voltage differences illustrated in FIG. 4 are the result of unavoidable differences between modules, and possibly different aging responses. Dot-dash line 414 of FIG. 4 represents a module having a much higher internal impedance than those represented by lines 410. As illustrated, line 414 has a high voltage about as high as that of the module represented by line 410a, and a low voltage about as low as that of the module represented by line 410d. The response represented by line 414 may be considered to represent a module which is failing or has failed. Such a module, when connected in series with the other modules, tends to decrease the fuel economy of the vehicle, because its relatively high voltage tends to limit the current which can be applied through the traction battery when recharging, and the electronic controls which tend to limit the charge current to avoid damaging the modules will, in attempting to protect the "bad" module, likewise tend to limit the charging current of the traction battery as a whole. Thus, the presence of the "bad" module tends to reduce the amount of energy which the traction battery can absorb in a given period of time, which means that the regeneration of energy from hard braking may be less complete than it might be in the absence of the "bad" module. Similarly, during acceleration, when energy is being transferred from the traction battery to the traction motor, the high internal impedance of the "bad" module creates a back voltage component which tends to offset part of the forward voltage, which tends to limit the amount of energy which can be removed from the traction battery in a given time period. Thus, the presence of a "bad" module tends to reduce the amount of regeneration, and to reduce the amount of energy available to the traction motor, both of which translate into degraded fuel economy. For this reason, it is desirable to identify such modules so that they may be replaced to thereby restore the fuel economy. The logic associated with FIG. 3a, in addition to aiding in identifying such "bad" modules, also shuffles energy among the modules in a manner which tends to equalize their voltages, so that the amount of regeneration is maximized during braking and during charging from the auxiliary source (the diesel-electric portion of FIG. 1), and so that maximum energy can be supplied to the traction motor.

The logic of FIG. 3a begins at a START block 310 during operation of the hybrid electric vehicle. The logic flows from START block 310 to a decision block 312, which determines if the traction battery discharge exceeds the specified level, which in the example is 50 amperes, and the discharge list has not been created. If the discharge current is high and the list has already been created, the logic flows from the NO output of decision block 312 by way of a path 312N to a further decision block 318. If the discharge current is high and the discharge list has not been created, the logic leaves decision block 312 by its YES output, and proceeds to a block 314. Block 314 represents sensing the current or present-time traction battery module voltages $V_{MOD-DIS}$, storing the voltages, and sorting the voltages so stored to form a discharge list ranking the voltages from maximum to minimum. From block 314, the logic flows to a block 316, which represents averaging of all of the traction battery module discharge voltages, to form a discharge average voltage $V_{AVG-DIS}$ for this discharge cycle. This completes the generation of the discharge list. From block 316, or directly from block 312 by way of logic path 312N, the logic arrives at a decision block 318. Decision block 318 determines if the traction battery is charging at the selected large current, and the charge list has not been created. If a large charge current exists, and the charge list has been created, the logic flows from decision block 318 by the NO output and a logic path 318N to a decision block 324. If the charge current is large and the charge list has not been created, the logic leaves decision block 318 by the YES output, and arrives at a block 320. Block 320 represents sensing the traction battery module voltages $V_{MOD\text{—}CHG}$ during the charge, storing the voltages so sensed, and ranking of the stored voltages to form a charge list. The logic flows from block 320 to block 322, which represents calculation of the average traction battery module voltage $V_{AVG\text{—}CHG}$ for this charge cycle. This completes the generation of the charge list and charge average. From block 322, or from decision block 318 by way of logic path 318N, the logic arrives at decision block 324. Decision block 324 merely determines if both the charge and discharge lists have been created, and sends the logic on for further processing if the lists have been made, and loops the logic back to block 310 if they have not both been generated.

From block 324 of FIG. 3a, the logic flows by way of a logic node A to a block 326, which represents the choosing or selection of the highest-voltage module from the charge list. This selection corresponds to selection of the module corresponding to line 414 (the "bad" module) or, if there is no bad module, selection of the module corresponding to line 410a. From block 326, the logic flows to a series of three decision blocks 328, 330, and 332, which together determine if the highest-voltage module selected by block 326 is a defective or "bad" module. Decision block 328 compares the difference between the charging voltage of the highest-voltage module and the average charging voltage of the modules $(V_{MOD\text{—}CHG})-(V_{CHG\text{—}AVG})$ with a threshold value, which might be, for example, 14 volts-13 volts avg=1 volt threshold. With this selection of the threshold value, any highest-voltage module having a charging difference greater than one volt, therefore, may be considered to have a characteristic of a defective module. However, the decision as to whether the highest-voltage module selected in block 326 is defective is made only if it has all three characteristics of a defective module. If the difference $(V_{MOD\text{—}CHG})-(V_{CHG\text{—}AVG})$ is small and does not exceed the reference value, the module is deemed not to be defective, and the logic leaves decision block 328 by the NO output, and proceeds directly to a block 336. If the difference $(V_{MOD\text{—}CHG})-(V_{CHG\text{—}AVG})$ exceeds the threshold, whatever its value, the logic exits decision block 328 by the YES output, and proceeds to a further decision block 330. Decision block 330 compares a threshold with the difference between the average discharge voltages of the modules $V_{DIS\text{—}AVG}$ and the discharge voltage $V_{MOD\text{—}DIS}$ of the highest-voltage module selected in block 326. A discharge voltage which is significantly lower than the average is a characteristic of a defective module. If the discharge difference $(V_{DIS\text{—}AVG})-(V_{MOD\text{—}DIS})$ is greater than a threshold such as one volt, the highest-value module is deemed not to be defective, and the logic leaves decision block 330 by the NO output, and arrives at block 336. On the other hand, if the discharge voltage difference of the highest-value module is greater than the selected threshold, whatever its value, the logic leaves decision block 330 by the YES output, and arrives at decision block 332. Decision block 332 examines the position of the particular traction module in the ranking of the discharge list, and deems the module to be defective if the module in question has a discharge value which lies in a selected fraction of the list, as for example in the lower third of the discharge list. If the ranking of the module under examination lies above the selected fractional portion of the discharge list, the module is deemed not to be defective, and the logic leaves decision block 332 by the NO output, and arrives at block 336. On the other hand, if the module in question fails all three criteria, including the criterion that the ranking of the module in question lies in the selected bottom portion of the discharge list, the logic exits from decision block 332 by the YES output, and arrives at a block 334, which represents the logging of the module into a list of modules requiring replacement. From block 334, or from the NO output of any one of decision blocks 328, 330, or 332, the logic arrives at block 336.

Block 336 of FIG. 3b represents the selection of the lowest-voltage module from those in the discharge list, corresponding to plot 410d of FIG. 4, or to plot 414 if the "bad" module is present. From block 336 of FIG. 3b, the logic flows by way of a logic node B to a series of three decision blocks 338, 340, and 342 of FIG. 3c, which together determine if the selected lowest-voltage module from the discharge list is a "bad" module. In general, a bad module has its charging voltage significantly above the average charging voltage, its discharging voltage significantly below the average discharging voltage, and its charging voltage in the top fraction, in this case chosen as the top third, of the charge list. More particularly, decision block 338 compares the difference between the charging voltage of the lowest-voltage module from the discharge list and the average charging voltage of the other modules, $V_{MOD\text{—}CHG}-V_{CHG\text{—}AVG}$, with a threshold value. If the difference is less than a threshold value, the module is deemed to be good, and the logic leaves by the NO output, and proceeds over a logic path 338N to decision block 346. If the difference noted by decision block 338 exceeds the threshold, it is taken as one indicium of a bad module, and the logic leaves decision block 338 by the YES output, and arrives at decision block 340. Decision block 340 takes the difference between the average discharge voltage of the modules and the discharge voltage of the selected lowest-voltage module from the discharge list, $V_{DIS\text{—}AVG}-V_{MOD\text{—}DIS}$, and compares the difference with a threshold value. If the difference does not exceed the threshold, the module is deemed good, and the logic flows from the NO output of block 340 by way of path 338N to decision block 346. If the difference exceeds the threshold value, this is taken as an indicium of a bad module, and the logic leaves decision block 340 by the YES output, and arrives at decision block 342. Decision block 342 compares the selected lowest-voltage-on-the-discharge-list module charging voltage with the charging voltages of the other modules on the charging list, and deems the module to have an indicium of a bad module if it is in a top portion, taken in this example as being in the top third, of the charge list. If the selected module is not in the top third of the charge list, the module is deemed to be good, and the logic leaves decision block 342 by the NO output, and proceeds to decision block 346. On the other hand, if the selected module is in the top third of the charge list, this is deemed to be an indicium of a bad module, and the logic leaves decision block 342 by the YES output, indicating the concatenation of three indicia of a bad module. From the YES output of decision block 342, the logic flows to a block 344, representing the listing of the selected module in the log of failed modules needing replacement. In general, the bad modules have so far been identified.

Figures 3C, 3D:
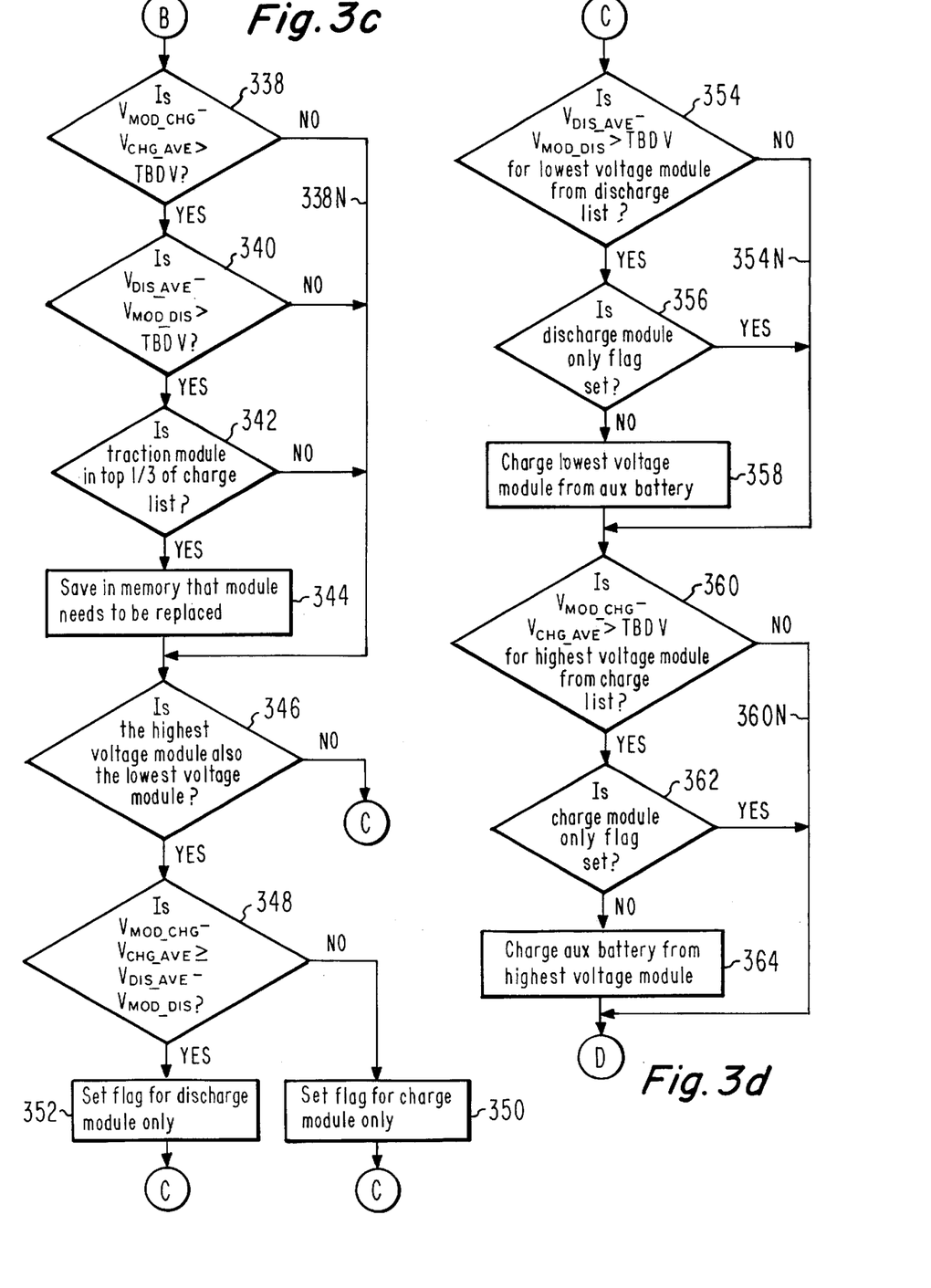

In general, the logic of FIGS. 3c and 3d charges the lowest-voltage module from the highest-voltage module. Blocks 346, 348, 350, and 352 of FIG. 3c take care of the situation in which the particular module is both the highest on the charge list and the lowest on the discharge list (and is therefore likely to be defective), so that the lowest-voltage module cannot be charged with energy ultimately drawn from the highest-voltage module (the actual charging of the lowest module is with energy from the auxiliary battery), since they are one and the same module. More particularly, decision block 346 of FIG. 3c compares the identity of highest voltage module with that of the lowest-voltage module; if they are not identical, the logic leaves decision block 346 by the NO output, and proceeds by a logic node C to block 354 of FIG. 3d. On the other hand, if decision block 346 finds that the high-voltage module is also the low-voltage module, this is deemed to be an indicium of a bad module, and the logic leaves decision block 346 by the YES output. From the YES output of decision block 346, the logic flows to a decision block 348. Decision block 348 attempts to make some sense from the situation in which the same module is both the high and the low module. It is possible that the module is bad, but it is at the present moment in the traction battery, and the traction battery condition should be optimized in its current condition, with the putatively bad module. Referring to FIG. 4, plot 414 represents the characteristics of a module which is both the high and the low module; however, note that the difference, represented by brace 416a, between its high value 414a and the average high value 418a of the other modules, is larger than the difference, represented by brace 416b, between the low voltage 414b of the module in question and the average low voltage 418b of all the modules. In general, one brace or the other will be greater, or in other words either the high difference or the low difference will be the greater. It makes sense to attempt to equalize the differences represented by the braces in order to maximize the traction battery capacity. For this purpose, decision block 348 takes the difference between the charging voltage of the selected module and the average charging voltage ($V_{MOD-CHG} - V_{DIS-AVG}$), and compares it with the difference between the discharging voltage of the selected module and the average discharging voltage ($V_{DIS-AVG} - V_{MOD-DIS}$). If the "upper" difference represented by brace 416a is greater than the "lower" difference represented by brace 416b, the logic leaves decision block 348 by the YES output, and arrives at a block 352, which represents the setting of a flag which identifies the module for discharging. On the other hand, if the lower difference represented by brace 416b is the greater, the logic leaves decision block 348 by the NO output, and flows to a block 350. Block 350 sets the flag for charging. From either block 350 or 352, the logic flows to decision block 354 of FIG. 3d.

One additional consideration which is not explicitly illustrated is that, when the logic leaves the YES output of decision block 346, thereby deciding that the same block is the highest and lowest, and a decision is then made that this particular defective module must be charged or discharged, it is then necessary to determine the next-highest or next-lowest one of the modules, respectively, which is to be the source of the energy for the charging or the sink for the discharging, respectively. As mentioned, all of the charging and discharging of the modules of the traction battery is performed using the auxiliary battery (or some other battery) as an intermediate.

The logic of FIG. 3d, in general, evaluates the voltage differences as so far determined or established, to see if they are significant, and if the next steps of charging and discharging are really necessary for module voltage equalization. In other words, while the differences found during the preceding stages of logic actually exist, they may be so small as not to warrant any action, and the logic of FIG. 3d makes this determination. More particularly, decision block 354 of FIG. 3d compares the lower difference voltage $V_{DIS-AVG} - V_{MOD-DIS}$ represented by brace 416b of FIG. 4 with a threshold value, and the logic leaves decision block 354 by the NO output if the lower difference voltage 416b is smaller than the threshold. This suggests that no action should be taken, and the logic flows from the NO output of block 354 by way of a logic path 354N to a further decision block 360. On the other hand, if the lower difference voltage 416b exceeds the threshold value, this is an indication that action may be necessary, and the logic flows to a further decision block 356. Decision block 356 examines the state of the discharge flag, which may have been set in block 352, and which when set indicates that only a discharge of the module is desired. If the discharge flag is set, the logic leaves decision block 356 by the NO output, and proceeds to decision block 360. On the other hand, if the discharge flag is not set, thereby indicating that the module may be charged, the logic leaves decision block 356 by the YES output, and proceeds to block 358. Block 358 represents the charging of the lowest-voltage module from the auxiliary battery. From block 358, the logic flows to decision block 360.

Decision block 360 of FIG. 3d compares the high difference represented by brace 416a of FIG. 4 with a threshold value. If the difference voltage is smaller than the threshold, no action may be needed, and the logic leaves decision block 360 by the NO output, and proceeds by way of a logic node D to a decision block 374 of FIG. 3e. On the other hand, if the high difference voltage represented by brace 416a exceeds the threshold value, the logic leaves decision block 360 by the YES output, and proceeds to a decision block 362. Decision block 362 examines the state of the charge flag which may have been set in block 350 of FIG. 3c, and routes the logic by way of its YES output and node D to decision block 374 of FIG. 3e if the flag is set. If the flag is not set, the module may be discharged, and the logic flows by way of the NO output of decision block 362 to block 364, which represents charging of the auxiliary battery from the module in question. From any one of blocks 360, 362, or 364, the logic flows to block 374 of FIG. 3e.

Figure 3E:
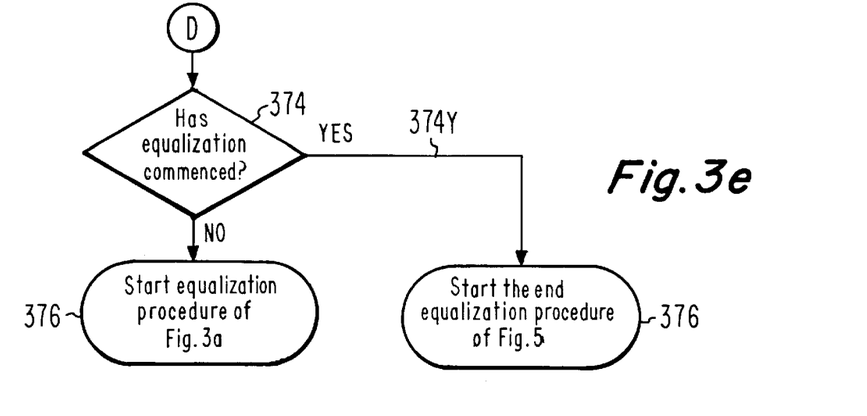

The logic of FIG. 3e actually commands the voltage equalization which has been analyzed by the logic of FIGS. 3a, 3b, 3c, and 3d. More particularly, decision block 374 of FIG. 3e determines if equalization has begun, and if it has begun, routes the logic by way of its YES output and a logic path 374Y to a block 376, which represents commencement of the end equalization process, described in conjunction with FIG. 5. On the other hand, if the equalization has not been required by the preceding logic, the evaluation performed by FIGS. 3a, 3b, 3c, and 3d is restart, by returning to START block 310 of FIG. 3a. Eventually, the logic of FIGS. 3a, 3b, 3c, and 3d may determine that equalization is required, and will perform the equalization. When the logic returns to FIG. 3e after equalization has begun, the logic of FIG. 3e will start the end equalization process.

Figure 5:
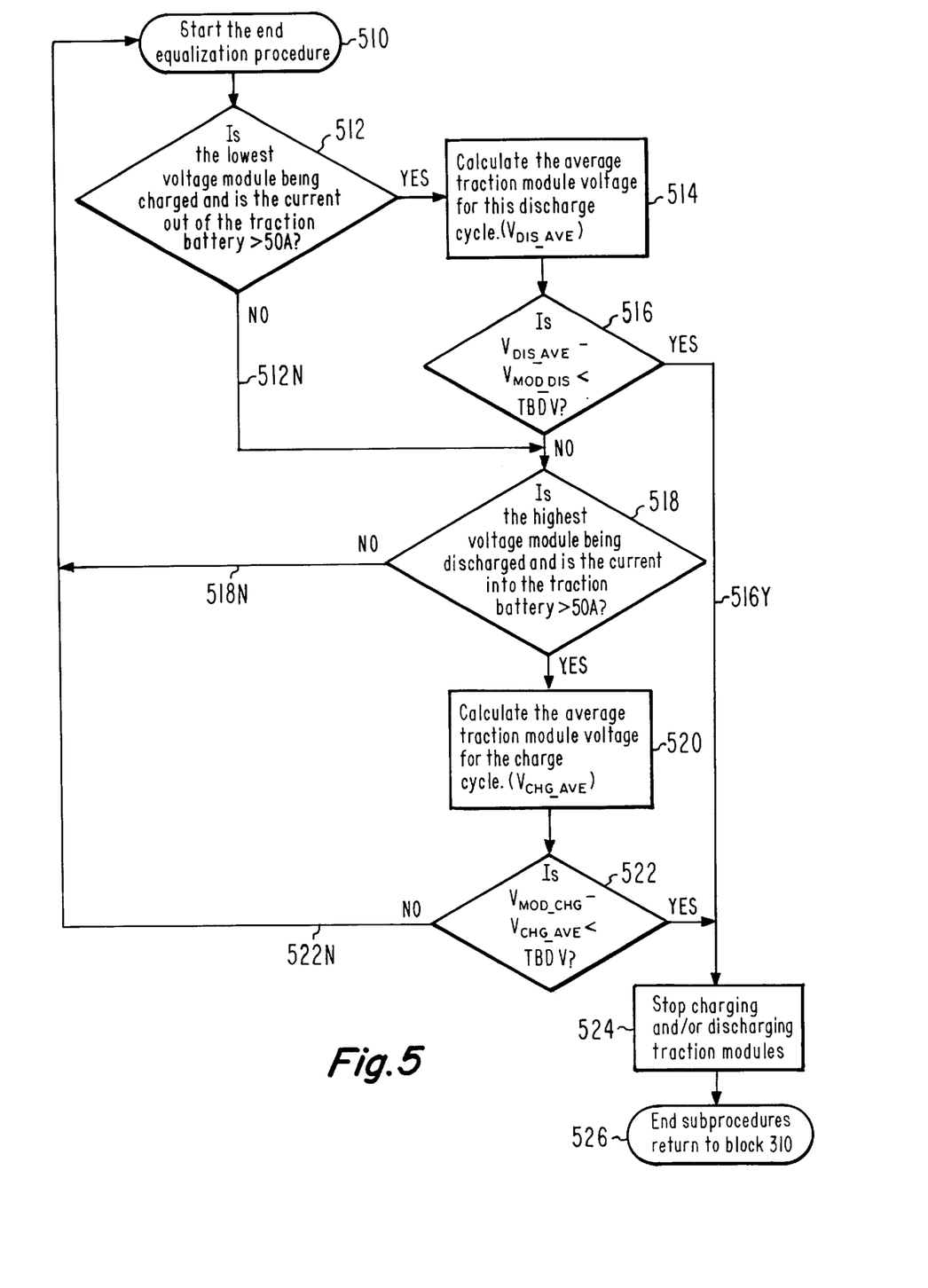
FIG. 5 is a simplified flow chart representing a logic flow which shuffles energy among the modules of the traction battery in a manner which tends to equalize their voltages, and therefore tends to maximize the fuel economy of the hybrid electric vehicle.

The logic of FIG. 5 performs the last procedure of the traction battery module maintenance, namely the equalization of the module voltages. The logic arrives from block 376 of FIG. 3e, and arrives at a START block 510. From START block 510 of FIG. 5, the logic proceeds to a decision block 512. Decision block 512 determines if both the lowest-voltage module is presently being charged and the discharge current from the traction battery exceeds the specified value, which in the specific example is 50 amperes. It is useful to note that the assumption is being made that the module charging apparatus is capable of charging the module at a current much lower than the traction battery maximum charging and discharging current; in other words, if the traction battery is discharging at 50 amperes and the module charger is capable of a maximum of 10 amperes, for example, the module is being "charged" in that the charger is supplying its 10 amperes, but the module has a net discharge of 40 amperes due to the 50-ampere discharge of the traction battery. If the lowest-voltage module is not being charged or the traction battery discharge does not exceed the set amount (50 amperes in the example), the logic leaves decision block 512 by the NO output, and proceeds by way of logic path 512N to a decision block 518. If the traction battery discharge current exceeds 50 amperes and the lowest-voltage module is being charged (remembering that this is actually a net discharge), the logic leaves decision block 512 by the YES output, and arrives at a block 514. Block 514 represents determination of the average traction battery module discharge voltage $V_{DIS-AVG}$ for this cycle. From block 514, the logic flows to a decision block 516, which determines the difference $(V_{DIS-AVG})-(V_{MOD-DIS})$ between the average module discharge voltage $V_{DIS-AVG}$ and the (net) discharge voltage $V_{MOD-DIS}$ of the module being charged, and compares the difference with a threshold. This provides a measure which enables the charging process for equalization of the module voltages to continue until the measurements made under conditions very close to actual operating conditions indicate voltage equality. In regard to voltage measurements, it should be noted that voltage measurements are ordinarily compensated for both temperature variations and charge or discharge current, and in this measurement an average internal impedance is assumed to be applicable to all the modules. If the currently-charging module voltage is within the threshold of the average module discharge voltage, the voltage equalization procedure is deemed to be finished, and the logic leaves decision block 516 by the YES output, and proceeds to block 524, representing the stopping of the charging or discharging subprocedure, or stops both subprocedures if both are in process, and block 526 ends the logic. The decision to stop the discharging of the high module to the low module when one of the high and low modules has come within the specified tolerance of the average value, as block 524 does, does not mean that the one of the modules which is not at that time within tolerance is ignored. Instead, the decision to stop when one of the two being processed is within tolerance allows the logic to restart at block 310 of FIG. 3a, to make a new decision as to which modules are now the highest and lowest, and to continue correction.

If the charging of the lowest-voltage module does not bring the module within the threshold value of the average module discharge voltage, the logic leaves decision block 516 of FIG. 5 by the NO output, and flows to a decision block 518. Decision block 518 represents a determination of whether the highest-voltage module from the charge list is being discharged concurrently with a charging current into the traction battery in excess of the exemplary 50 amperes. If not, the logic leaves decision block 518 by the NO output, and flows by logic path 518N back to START block 510. On the other hand, if the two conditions presently occur, the logic leaves decision block 518 by the YES output, and flows to a block 520. Block 520 represents calculation of the average traction battery module voltage $V_{CHG-AVG}$ for this charge cycle. From block 520, the logic flows to a decision block 522, which compares the difference between the charging voltage of the highest-voltage module from the charge list (remembering that it has a net charge, since the discharge current is only the exemplary 10 amperes while the traction battery is charging at 50 amperes) and the average charging voltage of the other modules $V_{MOD-CHG}$ with a threshold. If the difference is smaller than the threshold, the module voltage equalization procedure is deemed to be ended, and the logic flows from the YES output of decision block 522 to block 524. On the other hand, if the difference is smaller than the threshold, the logic leaves decision block 522 by the NO output, and flows by a path 522N back to START block 510.

Figure 6:
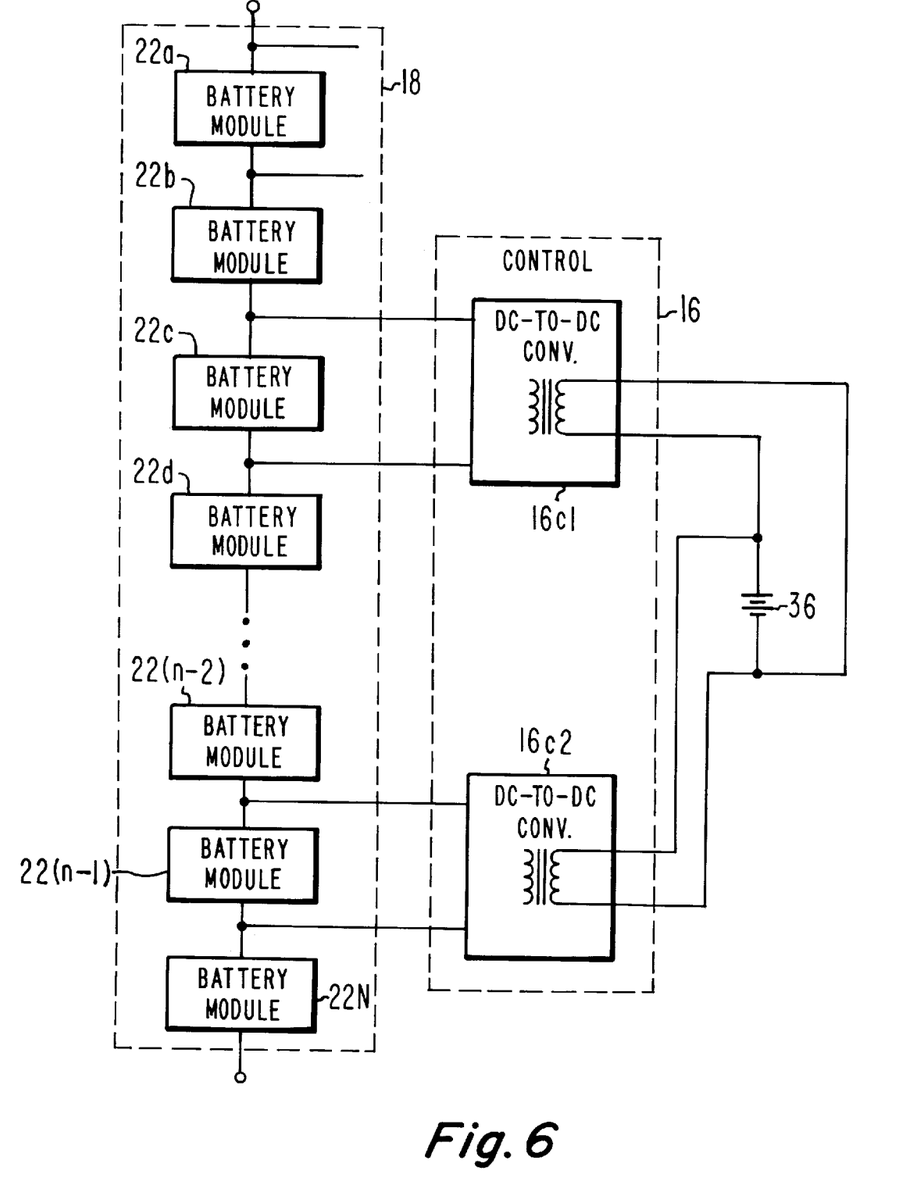
FIG. 6 is a simplified block diagram illustrating a traction battery including plural modules, and how pairs of modules may be interconnected by means of magnetically isolated dc-to-dc converters to perform charging of the low-voltage module simultaneously with discharging of the high-voltage module.

FIG. 6 is a simplified block diagram illustrating a traction battery including plural modules, and how pairs of modules may be interconnected by means of magnetically isolated dc-to-dc converters to perform charging of the low-voltage module simultaneously with discharging of the high-voltage module. In FIG. 6, the methods described above have already determined that module 22(n–2) is the highest-voltage module, and that module 22c is the lowest-voltage module. The Control block 16 of FIG. 6 has configured its switches (not separately illustrated) in a manner which interconnects a first dc-to-dc converter 16c1 to low module 22c, and a second dc-to-dc converter 16c2 to high module 22(n–1). Both converters are also coupled across auxiliary battery 36. The converters have their input and output terminals electrically isolated from each other, in known fashion, as by magnetic coupling, suggested by the transformer symbol within each of the converters 16c1 and 16c2. With the illustrated converter connections, energy can be coupled from high module 22(n–1) by way of converter 16c2, and applied to a load consisting of the auxiliary battery 36 in parallel with the terminals of converter 16c1. Converter 16c1 charges low module 22c with a current, which may or may not equal the current produced by the discharge of the high module 22(n–1). The difference between the currents simultaneously leaving converter 16c2 and that entering converter 16c1 will result in charge or discharge of the auxiliary battery 36.

Other embodiments of the invention will be apparent to those skilled in the art. For example, while the traction battery has been shown as producing "positive" voltage, it could as easily be connected in reverse, with appropriate control, whereupon the taps 20a, 20b, 20c, ..., 20n would be at the negative terminals of the modules. While the modules 22a, 22b, ..., 22n of FIG. 1 are illustrated as containing two series-connected twelve-volt batteries, modules with other numbers of batteries may be used, and modules with a single twelve-volt battery may simplify the controller. While the use of an auxiliary battery 36 for electronics keep-alive and for engine starting has been described in conjunction with FIG. 1, the auxiliary battery may be the normal ignition battery of the vehicle, which is used for lights, radio, and the like, but not for traction. While the auxiliary battery may be used for purposes in the vehicle other than providing a means for shuffling energy among the modules, as described, the auxiliary battery may be totally independent of vehicle functions other than providing such an energy path, if desired. The charging of the modules may be accomplished by a constant current, by a current ramp, or by a stepped current, with the steps being controlled by the charge state of the module. While the determination of the full-charge and partially-charged states has been described as being performed by voltage monitoring, those skilled in the battery arts know that other criteria may be used to determine the charge state, such criteria including voltage, internal impedance, or module temperature; the determination may be made using any one or any combination of these. The threshold values are indicated in the drawings as "to be determined" (TBD), because they depend upon various considerations which are specific to the embodiment, such as, for example, the capacity of the modules of the traction battery. While a single traction motor has been described, the invention does not depend upon the number of traction motors, which number may be two (one for each of two drive wheels), or four (one for each wheel) or any other number.

Thus, use of a method in accordance with the invention results in a vehicle which can autonomously maintain its batteries for optimum charge capacity, without the need to connect to an off-vehicle energy source (a wall outlet, for example) during the maintenance procedure, or more specifically during the module voltage equalization procedure. A method according to the invention tends to equalize the voltages of the series-connected modules (22a, 22b, . . . , 22n) of a traction battery (18) of a hybrid electric vehicle (10). The method is performed by a programmed processor (16), and includes the step (314, 320), while the vehicle is in operation (all of FIG. 3a, 3b, 3c, 3d and 3e assumes operation during the voltage measurements), of sensing the voltages of each of the modules (22a, 22b, . . . , 22n) under conditions approximating a selected load condition, such as a heavy load current (312) andor a heavy charging current (318), to thereby produce sensed module voltages. The sensed module voltages are stored (314, 320), at least temporarily, to thereby produce stored sensed module voltages. At least some of the voltages are sorted (314, 320) into at least one ordered ranking. In a preferred method, there are two ordered rankings (discharge list, block 314, and charge list, block 320). At least one of the modules, which has a stored sensed voltage near the maximum of the ranking, is selected (326) from the ordered ranking, to thereby identify a high module. Preferably, the selected module has the highest sensed voltage. Another one of the modules, which has a stored sensed voltage near the minimum of the ranking, is selected (336) from the at least one ordered ranking, to thereby identify a low module. The high module is partially discharged (364), and the energy made available by the partial discharge is used to charge the low module (358). In a particular embodiment of the method, the step of discharging the high module is performed until the voltage of one of the high module and the low module reaches a selected voltage (516, 522). In another embodiment of the method, the selected voltage is an average which includes the voltages of at least some of those modules of the traction battery which are not the high module and the low module. More particularly, in an embodiment of the method, the average is an average which includes the voltages of all of the modules of the traction battery, including the high and low module (316, 322). The step of partially discharging the high module, and coupling the energy made available by the discharging to charge the low module, is preferably performed by at least partially discharging the high module to an auxiliary battery (36), and at least partially discharging the auxiliary battery to the low module.

The step of the method involving sorting voltages of the modules into an ordered ranking includes sorting at least some of the voltages obtained when the traction battery is in a state of significant charging into a first ordered ranking (320), and sorting at least others of the voltages obtained when the traction battery is in a state of significant discharge into a second ranking (314). The one of the modules which has a stored sensed voltage near the maximum of the first ordered ranking is selected (326) from the first ordered ranking. The one of the modules which has a stored sensed voltage near the minimum of the second ordered ranking is selected (336) from the second ordered ranking to thereby identify a low module.

What is claimed is:

1. A method for tending to equalize the voltages of the modules of a traction battery of a hybrid electric vehicle, which traction battery is made up of a plurality of series-connected modules, said method being performed by a programmed processor, and comprising the steps of:

while said vehicle is in operation, sensing the voltages of each of said modules under conditions approximating a selected load condition, to thereby produce sensed module voltages;

at least temporarily storing a representation of said sensed module voltages to thereby produce stored sensed module voltages;

sorting at least some of said voltages into at least one ordered ranking;

selecting from said at least one ordered ranking one of said modules which has a stored sensed voltage near the maximum of said ranking, to thereby identify a high module;

selecting from said at least one ordered ranking another one of said modules which has a stored sensed voltage near the minimum of said ranking, to thereby identify a low module; and partially discharging said high module, and coupling the energy made available by said partial discharging to charge said low module.

2. A method according to claim 1, wherein said step of discharging said high module is performed until the voltage of one of said high module and said low module reaches a selected voltage.

3. A method according to claim 2, wherein said selected voltage is an average which includes the voltages of at least some of those modules of said traction battery which are not said high module and said low module.

4. A method according to claim 1, wherein said step of partially discharging said high module, and coupling the energy made available by said discharging to charge said low module, includes the step of at least partially discharging said high module to an auxiliary battery, and at least partially discharging said auxiliary battery to said low module.

5. A method according to claim 1, wherein:

said step of sorting at least some of said voltages into at least one ordered ranking includes sorting said at least some of said voltage obtained when said traction battery is in a state of significant charging into a first ordered ranking, and sorting at least others of said voltages obtained when said traction battery is in a state of significant discharge into a second ranking; and selecting from said at first ordered ranking said one of said modules which has a stored sensed voltage near the maximum of said first ordered ranking, to thereby identify said high module;

selecting from said at second ordered ranking said another one of said modules which has a stored sensed voltage near the minimum of said second ordered ranking, to thereby identify said low module.

6. A method for determining if a module is defective, where the module is series-connected in a battery subject to an intermittent discharge load and intermittent charging, both at varying current, said method comprising the steps of:

while said battery is supplying load current at a significant fraction of its full-load capability, sensing the voltages of each of said modules, to thereby produce sensed module discharge voltages;

at least temporarily storing a representation of said sensed module discharge voltages to thereby produce stored module discharge voltages;

sorting at least some of said stored module discharge voltages into a first ordered ranking;

while said battery is receiving charging current at a significant fraction of its maximum charging capability, sensing the voltages of each of said modules, to thereby produce sensed module charge voltages;

at least temporarily storing a representation of said sensed module charge voltages to thereby produce stored module charge voltages;

sorting at least some of said stored module charge voltages into a second ordered ranking;

selecting from said at first ordered ranking one of said modules which has a stored discharge voltage near the minimum of said first ranking, to thereby identify a low module;

averaging said stored module discharge voltages to produce an average module discharge voltage;

averaging said stored module charge voltages to produce an average module charge voltage;

taking the difference between said stored discharge voltage of said low module and said average module discharge voltage, to produce a low module discharge voltage difference;

comparing said low module discharge voltage difference with a threshold value, and deeming said low module to have a first indicium of a bad module if said low module discharge voltage difference exceeds said threshold;

taking the difference between said stored charge voltage of said low module and said average module charge voltage, to produce a low module charge voltage difference;

comparing said low module charge voltage difference with a threshold value, and deeming said low module to have a second indicium of a bad module if said low module charge voltage difference exceeds said threshold;

determining where, within said second ranking, said stored charge voltage of said low module occurs, and if it occurs within a specified region of said ranking, deeming said low module to have a third indicium of a bad module; and deeming said low module to be defective if said first, second, and third indicia of a bad module coexist.

7. A method according to claim 6, further comprising the step of saving a signal indicative of the deeming of said low module to be defective.

8. A method for determining if a module is defective, where the module is series-connected in a battery subject to an intermittent discharge load and intermittent charging, both at varying current, said method comprising the steps of:

while said battery is supplying load current at a significant fraction of its full-load capability, sensing the voltages of each of said modules, to thereby produce sensed module discharge voltages;

at least temporarily storing a representation of said sensed module discharge voltages to thereby produce stored module discharge voltages;

sorting at least some of said stored module discharge voltages into a first ordered ranking;

while said battery is receiving charging current at a significant fraction of its maximum charging capability, sensing the voltages of each of said modules, to thereby produce sensed module charge voltages;

at least temporarily storing a representation of said sensed module charge voltages to thereby produce stored module charge voltages;

sorting at least some of said stored module charge voltages into a second ordered ranking;

selecting from said second ordered ranking another one of said modules which has a stored charge voltage near the maximum of said ranking, to thereby identify a high module;

averaging said stored module discharge voltages to produce an average module discharge voltage;

averaging said stored module charge voltages to produce an average module charge voltage;

taking the difference between said stored discharge voltage of said high module and said average module discharge voltage, to produce a high module discharge voltage difference;

comparing said high module discharge voltage difference with a threshold value, and deeming said high module to have a first indicium of a bad module if said high module discharge voltage difference exceeds said threshold;

taking the difference between said stored charge voltage of said high module and said average module charge voltage, to produce a high module charge voltage difference;

comparing said high module charge voltage difference with a threshold value, and deeming said high module to have a second indicium of a bad module if said high module charge voltage difference exceeds said threshold;

determining where, within said first ranking, said stored discharge voltage of said high module occurs, and if it occurs within a specified region of said first ranking, deeming said high module to have a third indicium of a bad module; and deeming said high module to be defective if said first, second, and third indicia of a bad module coexist.

9. A method according to claim 8, further comprising the step of saving a signal indicative of the deeming of said high module to be defective.

* * * * *